W. H. GREEN.
WATER SOFTENER.
APPLICATION FILED APR. 7, 1917.

1,321,622.

Patented Nov. 11, 1919.
7 SHEETS—SHEET 1.

Witness:
Harry S. Gaither

Inventor:
Walter H. Green,
by Chamberlin & Freudenreich
Attys

W. H. GREEN.
WATER SOFTENER.
APPLICATION FILED APR. 7, 1917.

1,321,622.

Patented Nov. 11, 1919.
7 SHEETS—SHEET 7.

Inventor.
Walter H. Green,
by Chamberlin Freudenreich,
Attys

UNITED STATES PATENT OFFICE.

WALTER H. GREEN, OF CHICAGO, ILLINOIS.

WATER-SOFTENER.

1,321,622.　　　　　Specification of Letters Patent.　　Patented Nov. 11, 1919.

Application filed April 7, 1917. Serial No. 160,371.

*To all whom it may concern:*

Be it known that I, WALTER H. GREEN, a citizen of the United States, residing at Chicago, county of Cook, State of Illinois, have invented a certain new and useful Improvement in Water-Softeners, and declare the following to be a full, clear, and exact description of the same, such as will enable others skilled in the art to which it pertains to make and use the same, reference being had to the accompanying drawings, which form a part of this specification.

My invention has for its object to produce a simple and novel water treating apparatus in which the proper proportions between the chemical mixture and the raw water will be accurately maintained at all times.

A further object of my invention is to produce a simple and novel means for automatically controlling the flow of raw water in a water softening apparatus, according to the demand on the apparatus for treated water.

A further object of my invention is to produce a simple and novel stirring mechanism for the chemical mixture, whereby the power required to start the mechanism after it has been idle for some time is reduced to a minimum, while a small continuously operating force, as distinguished from a force necessary to overcome a considerable intermittent resistance, will maintain the mechanism in motion.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Reference being had to Figs. 1 to 11 of the drawings, 1 represents a storage reservoir of any usual or suitable construction above which is a chemical tank, 2, which may also be of any usual or suitable construction. In the arrangement shown, the lower portion of the chemical tank is made in the form of a semi-cylinder having its axis horizontal. Extending across the chemical tank, at the axis of the semi-cylindrical portion, is a rotatable shaft, 3, driven in any suitable way as, for example, by an electric motor, 4, mounted at any convenient point. The shaft 3 carries suitable blades or stirrers for keeping the solid particles of chemical in suspension during the operation of the apparatus. The usual construction is to provide a plurality of long blades extending entirely across the length of the chemical tank. With such an arrangement, the load on the driving motor is uneven when the liquid level in the tank is low, as there will be times when none of the blades are immersed in the liquid. Furthermore, it may happen that when the apparatus stops, one of the blades will be in the lower portion of the tank where it will become embedded in the settling chemical and require considerable force to loosen it on starting the apparatus. In accordance with my invention, instead of using long blades extending straight across the tank, I provide an arrangement which shall give a spiral disposition of the blades. This may conveniently be accomplished by employing a series of short blades instead of each long blade heretofore used, and displacing the short blades angularly of the axis of rotation. In this way the resistance to rotation is substantially uniform throughout each entire revolution and, at the time of starting the apparatus, only the power necessary to loosen a short blade embedded in the settled chemical need be applied; therefore a less powerful motor is required and greater efficiency will be obtained from the motor during normal operation.

In the arrangement shown, the total length of the short blades 5 is equal to two long blades extending from one end of the tank to the other; the arms, 6, on which the blades are carried, being equally spaced around the supporting shaft. Inside of the chemical tank near the top thereof and adjacent to the plane of travel of the two end arms of the agitator or stirrer, is a small hopper or funnel, 7, from which leads a discharge pipe, 8, adapted to deliver the chemical to the main storage reservoir in the usual way. One of the features of my invention consists in a unique device for delivering accurately measured quantities of chemical to the funnel. This device consists of a cup or plurality of cups, each carried on a rotating arm and so constructed that as the arm rotates the cup will take up a quantity of the chemical solution and thereafter, in passing across the top of the funnel, will discharge a predetermined smaller quantity into the funnel. The arms of the agitator adjacent to the funnel form convenient supports for the cups there being, in the arrangement shown, two cups, 9, supported in this way at diametrically opposed points so that one cup is in discharging position while the other is in a filling position.

Each cup consists of a suitable vessel having a spillway whose upper edge lies parallel with the axis of rotation and in such a position that liquid discharged from the spillway will not fall into the funnel when the cup is above the funnel, together with a discharge orifice so located that it will pass across the top of the funnel and empty into it during each revolution a portion of the contents of the cup in an amount depending upon the speed of travel, the size of the orifice, and the head of liquid between the upper edge of the spillway and the discharge end of the orifice. All of these are factors that can be accurately determined, so that the chemical may be fed accurately at a predetermined rate. In order to secure extreme accuracy, the upper edge of the spillway may be so arranged that a constant liquid level will be maintained above the discharge orifice during the time the cup is discharging into the funnel. This will have the further advantage of permitting the amount of chemical delivered to the funnel to be varied by covering up any part of the funnel and thus reducing the chemical by an amount equal to that which would otherwise enter the covered portion of the funnel.

The details of the cups are best illustrated in Figs. 5 to 8. In the arrangement shown, each of the cups, 9, is made of two castings constituting a hollow body portion having ears, 10, by means of which it may be attached to the supporting arm and a large opening or window, 11, extending from one end to the other and of considerable length in the circumferential direction. This opening or window is preferably covered by a screen, 12, of any suitable construction. At one edge of the opening or window is an inwardly projecting wall or partition, 13, having at its inner edge a rearwardly projecting curved flange, 14. At one end of the body member is a chambered projection, 15, having in one wall thereof a removable plug, 16, containing a discharge orifice, 17. The parts are so proportioned that when the cup is in the position shown in Fig. 6, which is the discharging position, there will be pocketed in the cup behind the wall or partition, 13, an excess quantity of chemical solution which is constantly spilling over the curved flange 14 and dropping back into the chemical tank through the opening or window 11, while some of the chemical solution is flowing through the discharge orifice, 17, into the funnel; the curvature of the flange 14 being on such a radius that the distance from the outlet end of the orifice 17 to a shifting highest point on the flange 14 remains constant during that portion of each revolution in which the discharge orifice lies above the funnel. The parts are so proportioned that there will be enough chemical solution retained in the cup in its upward travel to the discharging position to insure that some of it will still be pouring over the spillway when the discharge orifice passes beyond the funnel. It will be seen that the screen is located at some distance from the spillway so as not to interfere with the flow of water over the latter.

Figures 6, 7:
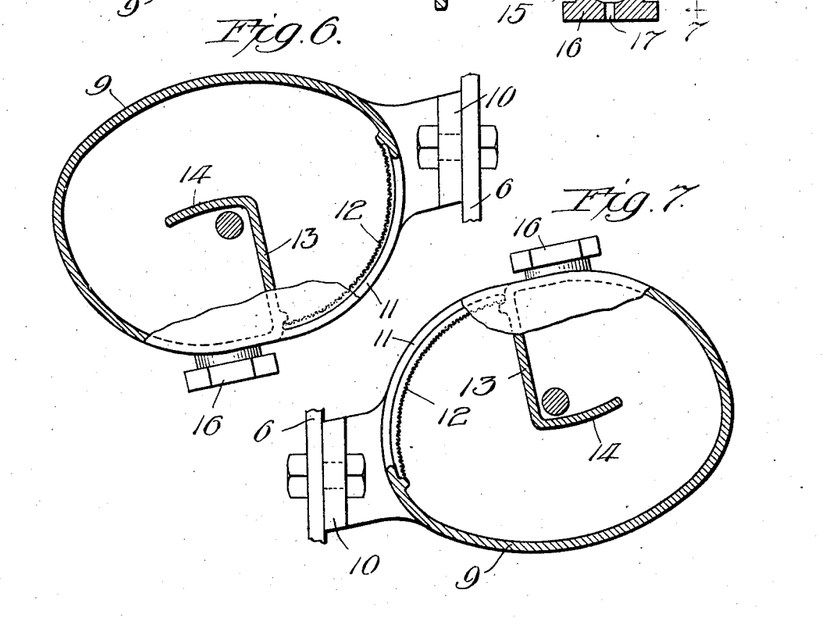
Fig. 6 is a view partly in end elevation and partly in section on line 6—7 of Fig. 5, showing the cup in its upper position in which it is discharging chemical solution.
Fig. 7 is a view similar to Fig. 6, showing the cup in its reversed position which it occupies when it is at the lowest point in its travel.
Figure 8:
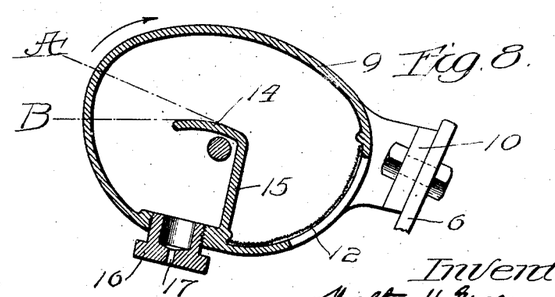
Fig. 8 is a view similar to Fig. 6 except that the plug containing the discharge orifice is shown in section and the device is shown in a somewhat different angular position than in Fig. 6.
Figure 9:
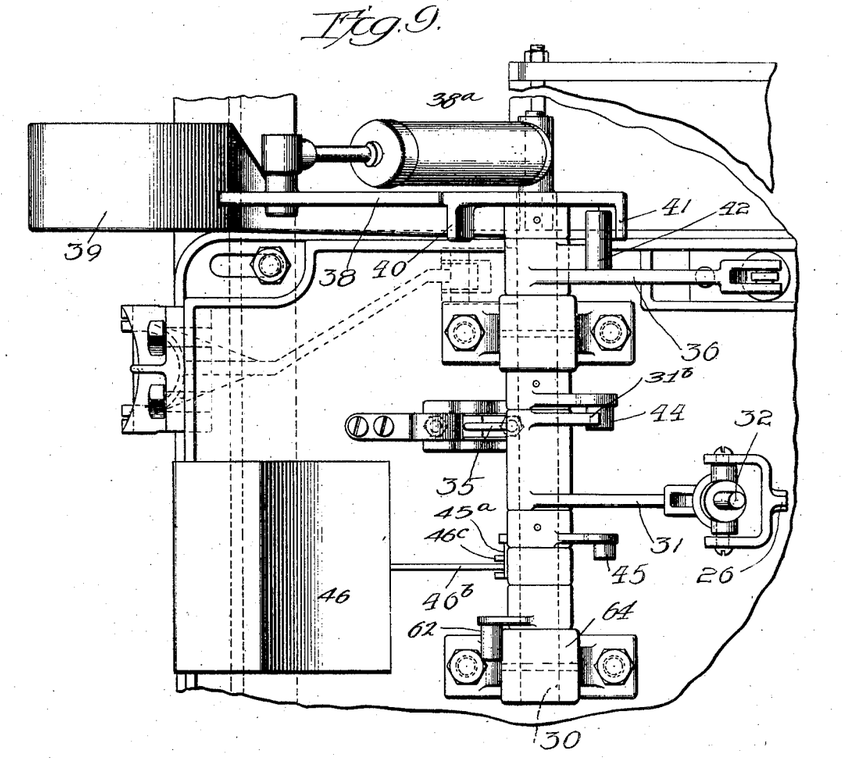
Fig. 9 is a top plan view on an enlarged scale of the tripping and locking mechanism for the water controlling valve.

The operation during the period that the chemical is being delivered into the hopper or receiver 7 can best be understood by reference to Figs. 6 and 8. In Fig. 6 the cup is shown in the position which it occupies just as the discharge orifice begins to travel across the top of the receiver 7; this being also the position shown in Fig. 3. Chemical is now flowing through the discharge orifice in the plug 16 and some of the chemical solution is flowing over the spillway, 14, and back into the chemical tank. The head under which the liquid is flowing out of the orifice depends upon the height above the outlet end of the orifice of a horizontal plane tangent to the spillway; this horizontal plane representing the surface level of the liquid in the cup. The parts are so proportioned that this distance remains substantially constant while the cup is traveling ahead in the clockwise direction from the position indicated in Fig. 6 to that indicated in Fig. 8, which latter figure shows the cup as it is just about to pass beyond the receiver 7. In Fig. 8 the dotted line A represents the plane tangential to the member 14 which was horizontal in Fig. 6 while the dotted line B represents the horizontal plane which is tangential to the member 14 while the cup is positioned as in Fig. 8. It will thus be seen that during the time the cup is traveling over the receiver the quantity of chemical in the cup is reduced by an amount representing that which is originally contained in the space bounded by the planes represented by the lines A and B; some of this chemical having flowed through the orifice into the receiver and some having flowed over the spillway in order to maintain the constant head.

As the cup travels downward from its discharging position the effect is that of turning it in the clockwise direction until, when it reaches the bottom of the chemical tank, its position has been completely reversed, as indicated in Fig. 7, from that occupied in its discharging position, the discharge orifice being at the top instead of at the bottom. It will be seen that as the cup moves downwardly the opening or window 11 passes progressively below the surface of the solution, allowing the solution to flow into the interior of the cup. As the solution rises in the cup to the level of the curved flange 14, it pockets the air in the space above the flange and behind the wall or partition 13; the only outlet for such air being through the discharge orifice 17. Consequently a large amount of air will be forced out through the discharge orifice in advance of the rising chemical solution, thus blowing out of the orifice any foreign matter that may tend to accumulate therein, and effectually cleaning the orifice. Therefore, since the screen prevents the entrance of any particles large enough to clog the orifice, the latter will always be kept clean.

Another feature of my invention has to do with the control of the flow of water to meet the demands on the apparatus. The raw water is delivered through a suitable pipe, 18, having a valve branch, 19, for supplying water to the chemical tank when needed. The pipe 18 is connected to a delivery pipe, 20, extending through a float chamber, 21, and having a restricted outlet end, 22, at the bottom. There is an opening, 23, through the wall of the pipe 20 at a point near the bottom of the float chamber. Between the top of the pipe 20 and the supply pipe 18 is a controlling valve, 24. A float, 25, in the chamber 21, acting through a valve actuating lever, 26, controls the valve 24 so as to maintain a constant head of water above the discharge outlet 22. By using the chemical-feeding apparatus heretofore described and the delivery of water at a constant head, perfect proportioning of the chemical solution and raw water may be obtained.

In the so called constant rate machine, there will be times when the supply is greater than the demand and the storage reservoir becomes full. Then it becomes necessary to shut down the apparatus until some of the stored water has been used. Another feature of my invention has to do with means for automatically starting and stopping the apparatus according as the water in the storage reservoir falls to a predetermined low level or rises to a predetermined high level. The means for accomplishing this is as follows: At one side of the float chamber 21 is arranged a horizontal shaft, 30. Loose on the shaft is a radial arm, 31, having at its outer end a rod, 32, projecting upwardly through and slidable in the actuating lever, 26, for the valve 24. On the rod 32 below the arm 26 is a collar, 33, between which and the arm is a spring cushion, 34. A catch, 35, engaging with a shoulder 31$^a$ on the inner end of the arm 31 holds the arm in the position shown in Figs. 2 and 10, namely the valve closing position, when the parts are brought to the positions illustrated in these figures. Loose on the shaft 30 is a second radial arm, 36, from the outer end of which is hung a float, 37, arranged in the main reservoir. Fixed to the shaft, adjacent to the arm 36, is an arm, 38, having at its outer end a weight, 39, and having at its inner end two lugs, 40 and 41, spaced apart angularly of the shaft. A dash pot 38$^a$ may be connected to the arm 38 for the purpose of cushioning its fall into its extreme positions. On the arm 36 is a lug or finger, 42, lying between the lugs 40 and 41. The shaft 30 is provided with a finger, 44, in position to engage with the catch 35 and release the catch when the shaft is turned in one direction and to engage with a part 31$^b$ on the inner end of the arm 31 to raise the arm when the shaft is turned in the other direction.

Figure 1:
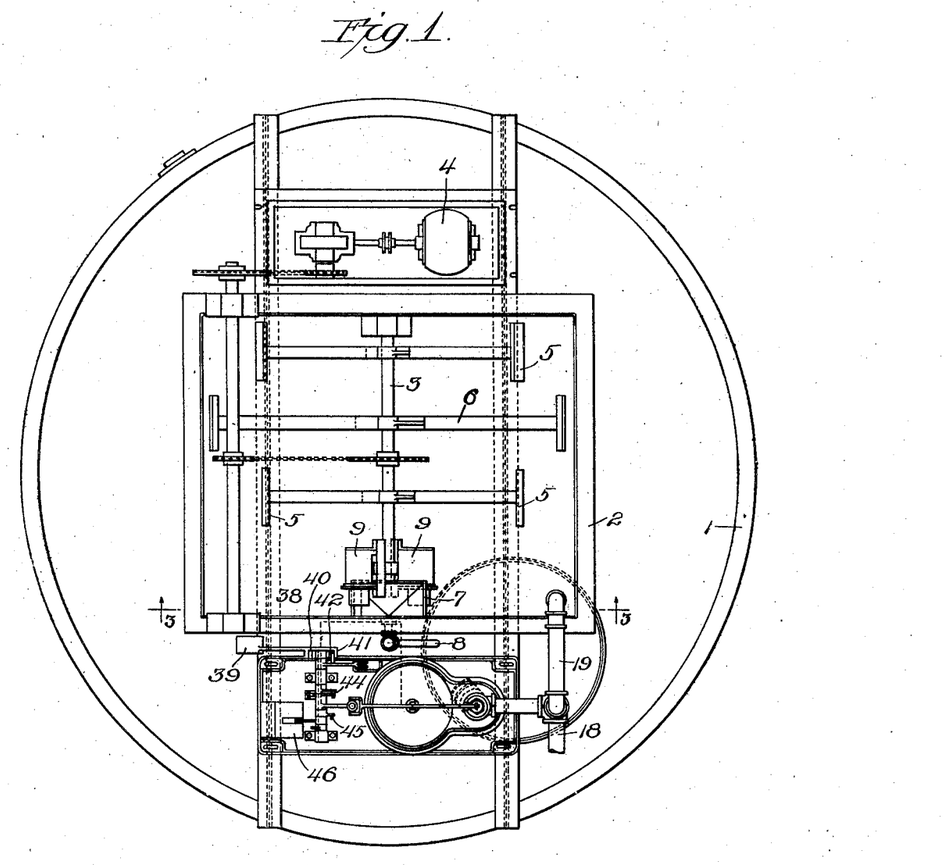
Figure 1 is a top plan view of a softening apparatus arranged in accordance with a preferred form of my invention.
Figure 2:
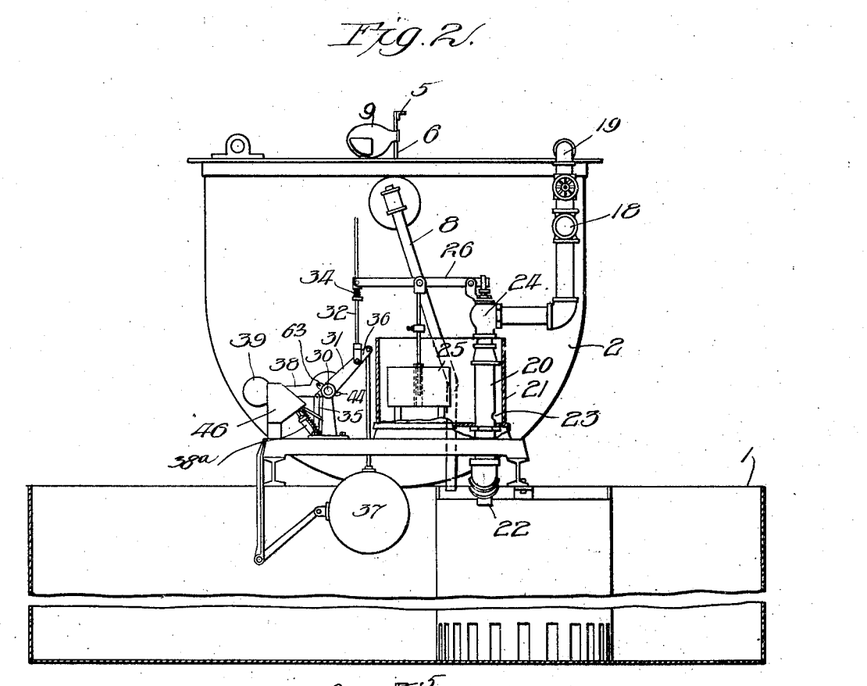
Fig. 2 is a view partly in side elevation and partly in section, looking upwardly from the bottom of Fig. 1.
Figure 3:
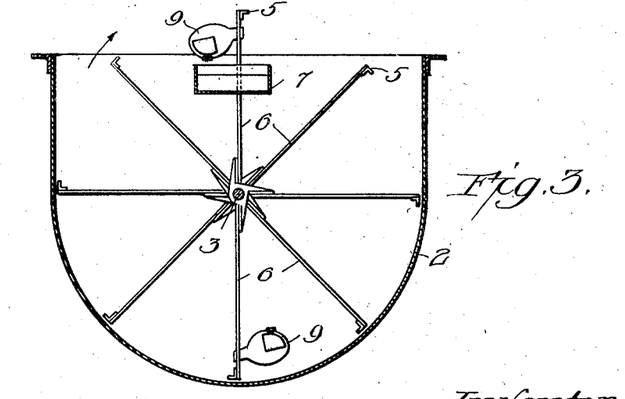
Fig. 3 is a vertical section through the chemical tank, taken approximately on line 3—3 of Fig. 1.
Figure 4:
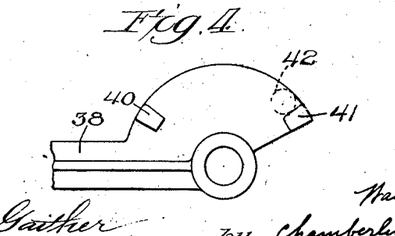
Fig. 4 is a side elevation of a fragment of the weighted actuating lever forming part of the governing mechanism for the raw water valve.
Figure 5:
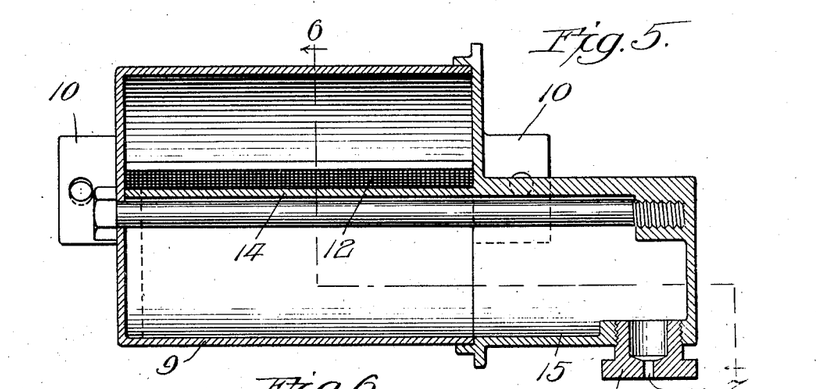
Fig. 5 is an axial section on an enlarged scale through one of the chemical delivering cups.
Figure 10:
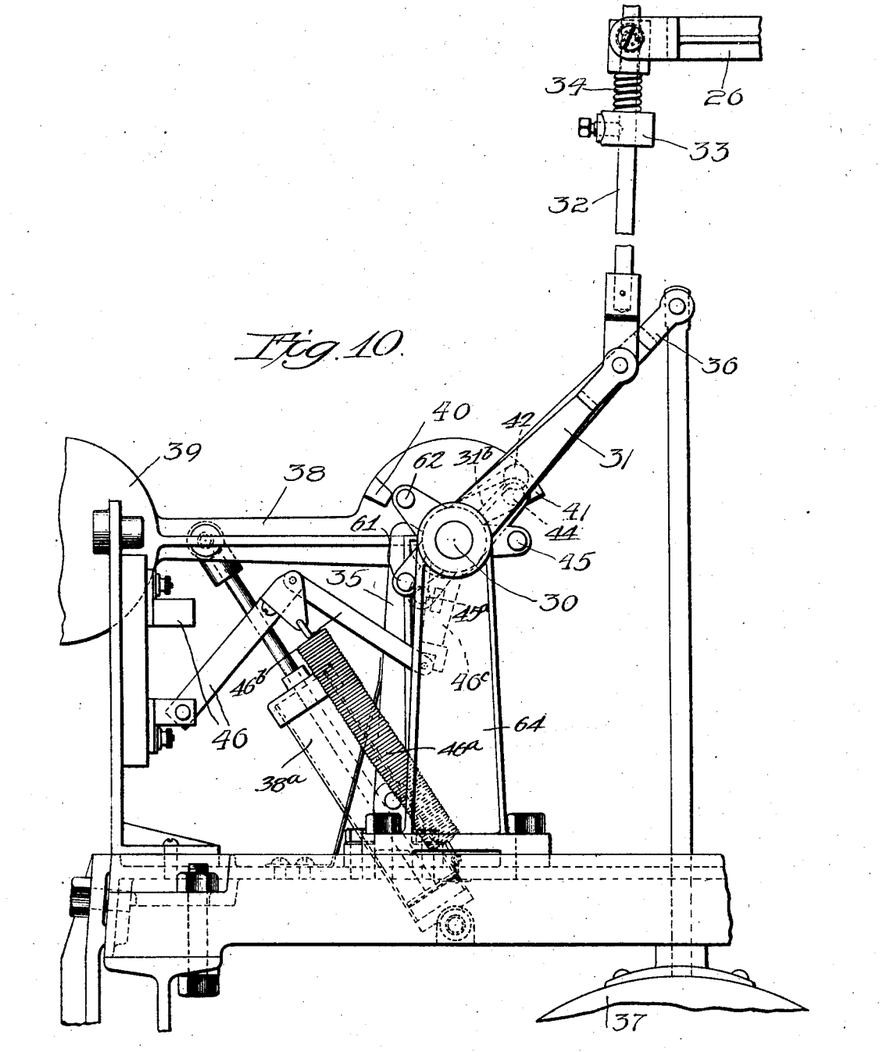
Fig. 10 is a side elevation of the parts shown in Fig. 9, the casing on the electric switch being omitted.
Figure 11:
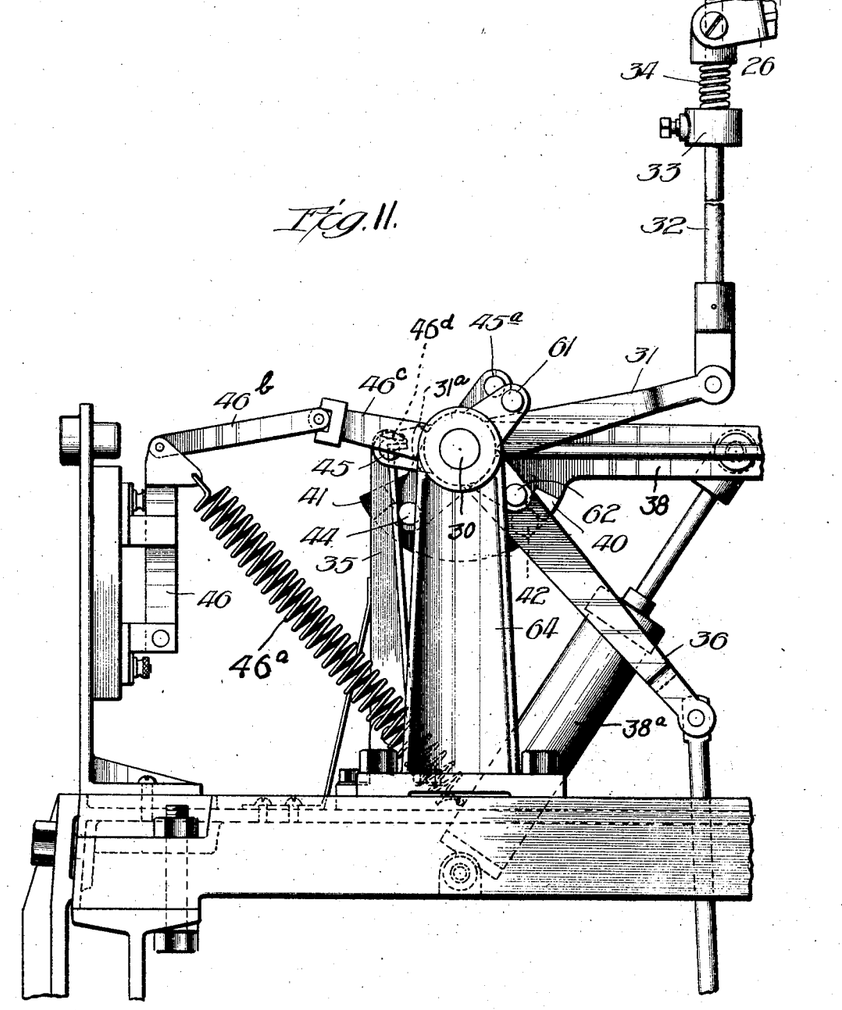
Fig. 11 is a view similar to Fig. 10, showing the parts in a different position.
Figures 12, 13:
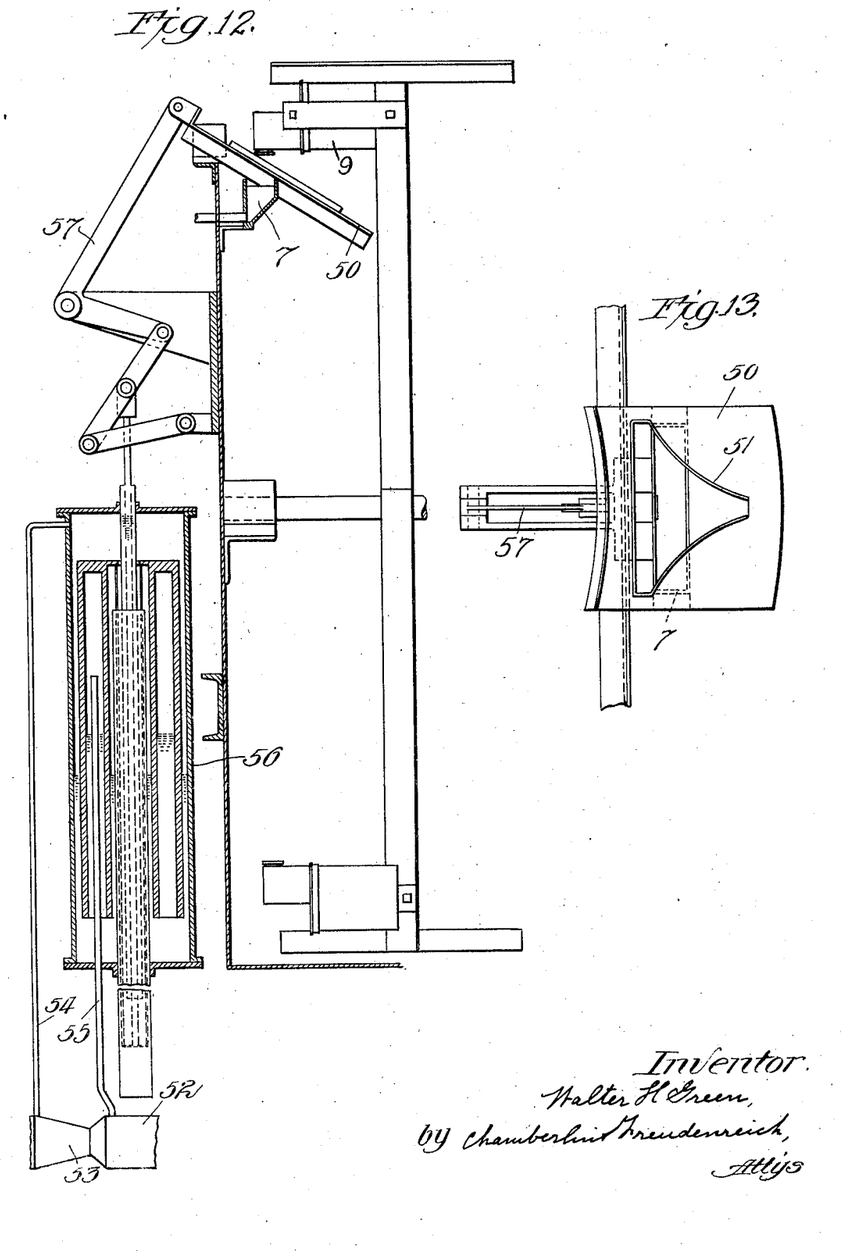
Fig. 12 is a sectional view of part of an apparatus, illustrating the means for regulating the chemical supply for a variable rate apparatus.
Fig. 13 is a top plan view of the chemical collecting funnel and shield illustrated in Fig. 8.

Assuming that the main reservoir is full of water and that the latter is being withdrawn, so that the surface level is falling, it will be seen that the float 37 gradually drops, the finger or projection 42 thereon engaging with the projection 41 on the weighted lever and causing the lever to be turned gradually in the clockwise direction as viewed in Figs. 2 and 10. Finally the weighted lever will pass the vertical center and will then drop quickly ahead until the projection or lug, 40, is arrested by the projection or finger 42 as indicated in Fig. 11. This quick movement of the weighted lever takes place when the predetermined low level in the reservoir is reached and it has the effect of turning the shaft 30, releasing the catch which, acting through the arm 31, holds the valve 24 closed, and permits this valve to be opened by reason of the weight of the actuating arm and parts connected therewith. At the same time, a finger, 45, secured to the shaft 30, closes a controlling switch 46 for the motor, so that the agitator and chemical feeding mechanism are started at the same time that the water is turned on.
The controlling switch may conveniently be a simple knife blade switch, to the blade of which is attached a tension spring, 46$^a$, tending constantly to open the same; while between the blade and the shaft is a toggle composed of the members 46$^b$ and 46$^c$, the latter being hung loosely at one end on the shaft. As shown in Fig. 11, the finger 45 strikes a lug, 46$^d$, on the arm 46$^c$ and closes the switch against the tension of the spring.
When the water is turned on, it fills the float chamber 21, causing the float 25 to rise, and thus placing the valve 24 under the control of the float so as to maintain the constant head at the discharge outlet. When the water again rises in the main reservoir, the float 37 also rises, gradually lifting the weighted lever 38, until the latter passes the vertical center, whereupon it will turn the shaft 30 quickly in the direction to raise the arm 31 to its valve closing position where it is held by the catch 35 engaging the shoulder 31$^a$ on the inner end of the arm. The switch 46 is opened by a part of the member 45, indicated at 45$^a$, engaging the lug 46$^d$ on the switch-controlling toggle. The motor and the chemical delivery mechanism continue to operate during the time water is flowing into the apparatus, that is as long as the switch 46 remains closed. When the high water level is reached that is, when the main storage reservoir 1 is full, the flow of water into the apparatus ceases and therefore the delivery of chemical into the storage reservoir must also cease. This stopping of the chemical delivery of course occurs when the switch 46 is opened so that the motor and the shaft 3, driven by the motor, come to rest. After the high level has been reached in the main reservoir and the motor has been stopped and the water shut off, no further action takes place until the water in the main reservoir has been withdrawn in sufficient quantities to lower the level to the predetermined low level at which the operation heretofore described begins.
If desired, fingers or stops, 61 and 62, may be fixed to the shaft to engage with a stationary part, 64, at the limits of the required angular movements of the shaft 30. Where the water is to be supplied at a variable rate instead of at a constant rate, the chemical solution must be supplied at a rate which varies in unison with the flow of water. This variation may conveniently be effected by placing over the funnel 7, as illustrated in Figs. 12 and 13, a shield, 50, movable across the funnel and having therein an opening, 51, varying gradually in width in the direction of movement of the shield. By shfting the shield back and forth, the amount of chemical which will be deposited from one of the cups while traveling over the funnel, may be varied at will. The position of the shield may be automatically controlled in any suitable way. In the arrangement shown, the water supply pipe, 52, contains a Venturi tube section, 53, or an orifice, the pressure on opposite sides of which will vary according to the rate at which water is being supplied. Pipes, 54 and 55, may be carried from opposite sides of the orifice or Venturi tube to a differential actuator, 56, of any suitable construction which, in turn, through suitable connections, 57, moves the shield 50 back and forth in response to variations in the rate at which the raw water is being supplied.

I claim:

1. In an apparatus of the character described, a chemical tank, a receiver, a receptacle having a spillway and a reduced discharge orifice, and means for carrying said receptacle through the chemical in the tank and then across the receiver in such a manner that the chemical solution flows simultaneously through said orifice into the receiver and over the spillway into the tank.

2. In an apparatus of the character described, a chemical tank, a receiver, a receptacle having a spillway and a reduced discharge orifice, and means for carrying said receptacle through the chemical in the tank and then across the receiver in such a manner that the chemical solution flows simultaneously through said orifice into the receiver and over the spillway into the tank, said spillway having a surface constructed and arranged to maintain a substantially uniform distance between the discharge orifice and a horizontal plane tangential to the spillway in the various positions which the receptacle takes while passing over the receiver.

3. In an apparatus of the character described, a chemical tank, a receiver, a feeding device adapted to take up chemical solution from the tank and carry it past said receiver, said device having an orifice adapted to deliver chemical solution to the receiver while the device is traveling past the same, and said device also having a discharge outlet in a position to permit a part of the solution to flow back into the tank while delivery is being made to the receiver and maintain a predetermined head of the solution above the orifice.

4. In an apparatus of the character described, a chemical receiver, and a container for a chemical solution movable past said receiver, said container having a discharge orifice adapted to deliver to the receiver only a small part of the contents of the container while the latter is traveling past the receiver, and a spillway associated with the container for maintaining a constant head above said orifice during the time the latter is discharging into the receiver.

5. In an apparatus of the character described, a chemical receiver, a container movable past said receiver, said container having a discharge orifice extending through that part which is the bottom while the container is above the receiver so as to permit chemical solution to be discharged vertically downwardly from the container into the receiver while the container is traveling past the receiver, and means associated with said container for maintaining a head of liquid above said orifice so as to force a flow of chemical solution from the container into the receiver.

6. In an apparatus of the character described, a chemical receiver, a container movable past said receiver, said container having a discharge orifice adapted to permit chemical solution to flow from the container into the receiver while the container is traveling past the receiver, and means for maintaining an approximately uniform liquid head above said orifice during the time chemical solution is flowing through the orifice into the receiver.

7. In an apparatus of the character described, a chemical receiver, a container for chemical solution movable past said receiver, said container having a discharge outlet for delivering chemical solution to the receiver and an overflow or waste outlet, and means for manipulating said container so that during the movement past the receiver, a flow of chemical solution is maintained through both outlets and a surface level is maintained at the overflow or waste outlet.

8. In an apparatus of the character described, a chemical tank, a container for chemical solution, said container having a restricted discharge orifice and a chemical inlet, and means for moving the container into a body of chemical solution in the tank in such a manner that the chemical solution in entering said inlet traps air within the container and forces it out through the discharge orifice.

9. In an apparatus of the character described, a chemical container comprising a receptacle having a restricted discharge orifice in the bottom wall and having at the edge of one of its side walls above said orifice an inwardly projecting curved flange forming a spillway.

10. A chemical container comprising a member shaped roughly in cross section like a spiral inclosed at the ends by walls transverse to the axis of the spiral so as to form a receptacle having an inlet opening lying between said end walls and between the free edge of the outer convolution of the spiral and the next convolution, a strainer over said inlet opening, and there being a discharge orifice leading to the exterior of the container from a space within the inner convolution of the spiral.

11. In an apparatus of the character described, a chemical tank, a receiver, a device adapted to dip up chemical solution from the tank and movable across said receiver, said device having a discharge outlet for delivering chemical solution to the receiver in its passage across the latter, and means for varying the effective length of the receiver in the direction of travel of said device.

12. An apparatus of the character described comprising a chemical tank, a receiver, a feeding device adapted to dip up chemical solution from the tank and carry it across said receiver, said feeding device having a discharge orifice in position to deliver chemical to the receiver when the device is passing over the latter, and means for so supporting said feeding device that the air is pocketed therein as it enters the chemical in the tank and is forced to flow out through said orifice and thus keep the latter clean.

13. In an apparatus of the character described, a chemical tank, a chemical receiver, a member rotatable about a horizontal axis in said tank, and a feeding device mounted on said member at such distance from the axis of rotation and in such relation to said receiver that the feeding device is caused to dip into the chemical solution in the tank and carry a quantity thereof across the top of the receiver, said feeding device comprising a receptacle having in the wall thereof that forms the bottom when the feeding device is above the receiver a discharge orifice adapted to deliver chemical solution to the receiver, said feeding device also having a side wall terminating at its upper edge in a spillway adapted to cause a part of the chemical solution in the feeding device to flow back into the chemical tank while the receiver is being supplied through said orifice.

14. In an apparatus of the character described, a chemical tank, a chemical receiver, a member rotatable about a horizontal axis in said tank, and a feeding device mounted on said member at such distance from the axis of rotation and in such relation to said receiver that the feeding device is caused to dip into the chemical solution in the tank and carry a quantity thereof across the top of the receiver, said feeding device comprising a receptacle having in the wall thereof that forms the bottom when the feeding device is above the receiver a discharge orifice adapted to deliver chemical solution to the receiver, said feeding device also having a side wall terminating at its upper edge in a spillway adapted to cause a part of the chemical solution in the feeding device to flow back into the chemical tank while the receiver is being supplied through said orifice, said spillway having an upper curved surface so shaped that during the time the feeding device is traveling past the receiver horizontal planes which are successively tangential thereto will be disposed at approximately equal distances from the discharge orifice.

15. A chemical container comprising a member shaped in cross section like a spiral and closed at the ends by walls transverse to the axis of the spiral, there being a discharge orifice leading from the space within the inner convolution of the spiral.

16. In an apparatus of the character described, a storage reservoir, a water supply pipe, a valve in said pipe, a float in said reservoir, connections between said float and said valve for causing the valve to close when the float rises to a predetermined level and remain locked in its closed position until the float drops to a predetermined low level, a constant level reservoir supplied by said pipe, and a float in said constant level reservoir for controlling said valve.

17. In an apparatus of the character described, a chemical tank, a container for chemical solution, said container having a restricted orifice and an inlet for the chemical solution, and means for preventing entry through said inlet of particles large enough to block said restricted orifice.

18. In an apparatus of the character described, a chemical tank, a receiver, a receptacle having a spillway and a reduced discharge orifice, and means for carrying said receptacle through said chemical tank and then across the receiver in such a manner that the chemical solution flows simultaneously through said orifice into said receiver and over the spillway into the said tank, and a strainer arranged externally of said spillway and spaced apart therefrom.

19. In an apparatus of the character described, a container for a chemical solution having a reduced discharge orifice, a strainer, and a spillway between said orifice and said strainer and spaced apart from the latter.

In testimony whereof I sign this specification.

WALTER H. GREEN.